United States Patent
Srinivas et al.

(10) Patent No.: US 11,379,526 B2
(45) Date of Patent: Jul. 5, 2022

(54) DISAMBIGUATION OF MASSIVE GRAPH DATABASES

(71) Applicant: INTUIT INC., Mountain View, CA (US)

(72) Inventors: Sudhir Srinivas, Fremont, CA (US); Kevin Geraghty, Dublin, CA (US)

(73) Assignee: INTUIT INC., Mountain View, CA (US)

( * ) Notice: Subject to any disclaimer, the term of this patent is extended or adjusted under 35 U.S.C. 154(b) by 278 days.

(21) Appl. No.: 16/270,966

(22) Filed: Feb. 8, 2019

(65) Prior Publication Data

US 2020/0257731 A1    Aug. 13, 2020

(51) Int. Cl.
*G06F 16/901* (2019.01)
*G06N 20/20* (2019.01)
*G06N 20/10* (2019.01)

(52) U.S. Cl.
CPC ......... *G06F 16/9024* (2019.01); *G06N 20/10* (2019.01); *G06N 20/20* (2019.01)

(58) Field of Classification Search
CPC ..... G06F 16/9024; G06N 20/20; G06N 20/10
USPC .......................................... 707/798
See application file for complete search history.

(56) References Cited

U.S. PATENT DOCUMENTS

| 10,803,050 B1 * | 10/2020 | Salkola ................. G10L 15/187 |
| 2006/0242444 A1 * | 10/2006 | Novik ................. G06F 16/1844 713/400 |
| 2011/0125746 A1 * | 5/2011 | Leary ................... G08B 25/016 707/737 |
| 2014/0006404 A1 | 1/2014 | Mcgrew et al. |
| 2015/0095303 A1 | 4/2015 | Sonmez et al. |
| 2015/0154306 A1 | 6/2015 | Lightner et al. |
| 2019/0050445 A1 * | 2/2019 | Griffith ................. G06F 16/213 |
| 2020/0104321 A1 * | 4/2020 | Sharma ................. G06F 16/212 |

FOREIGN PATENT DOCUMENTS

| KR | 2018-0007004 A | 1/2018 |
| WO | 2013-101490 A1 | 7/2013 |

* cited by examiner

*Primary Examiner* — Hicham Skhoun
(74) *Attorney, Agent, or Firm* — Patterson + Sheridan, LLP

(57) ABSTRACT

Certain aspects provide techniques for disambiguating graph data. In one example, a method includes receiving entity data from a data source in a first format; converting the entity data in the first format to a second format, wherein the second format is a standardized input format for a disambiguation pipeline; determining a blocked data set from the entity data in the second format based on a blocking parameter, wherein: the blocked data set comprises data regarding a first plurality of entities, and the first plurality of entities is a subset of a second plurality of entities represented in the entity data from the data source; matching at least two entities in the first plurality of entities in the blocked data set; merging the at least two entities into a single entity; generating a unique ID for the single entity; and importing the single entity into a graph database.

20 Claims, 5 Drawing Sheets

DISAMBIGUATION OF MASSIVE GRAPH DATABASES

INTRODUCTION

Aspects of the present disclosure relate to disambiguation of massive graph databases.

Organizations frequently rely on graph databases to capture relationships within their customer base. Similarly, organizations that provide applications and application services to their customers (e.g., application users) may use graph databases to organize users' data and to provide improved application services.

For example, each user of an application, such as a financial service application, may have many contacts representing many different relationships to that user. In a graph database structure, each user may be a node and each relationship may be represented by an edge between the user's node and a contact's node. Similarly, each of the user's contacts may have relationships amongst themselves, which may be reflected by further edges between those contacts' nodes. From the perspective of the application provider, understanding these relationships may enable providing richer application features and services to application users.

Unfortunately, the nature of the way in which users capture their data in applications (e.g., contact information) varies widely, and application providers are generally apt to provide highly-customizable or even free-form data capture capabilities so that users may enter, edit, and otherwise track their data in a way that best suits them. Unfortunately, this means that different users may enter different data in reference to the same entity.

For example, in the example context of contact information stored within an application, different users may shorten, abbreviate, misspell, add other personalized text, or otherwise change a "name" of the same contact, such as: "Bob's Subs", "Bobs Submarine Shop", "B-Subs", and "Bob Subs—Fav Lunch Spot." From the perspective of the application provider, it is unclear whether these are all the same entity or all different entities. In a graph context, it means that each of the aforementioned iterations of "Bob's Submarine Shop" may be a separate node in a graph database, despite being the same entity. Thus, it is difficult if not impossible to make connections between the various users that patronize "Bob's Submarine Shop" using a graph database in which "Bob's Submarine Shop" is represented by many disparate entities. And this is just considering one field—the name field. A conventional contact record has many fields, which exacerbates the problem significantly.

Notably, the application design philosophy in which users are given wide latitude in how to store their data is not limited to contact information, but also applies to any sort of information that applications may be collecting depending on the nature of the application. Thus, in any application context, a lack of structure for any captured data field, while convenient for the application user, is extremely inconvenient for the application provider in terms of being able to leverage the relationships inherent in the data through a graph database.

Conventional methods of resolving these ambiguities include manually reviewing various nodes in a graph database in order to try and find nodes that can be consolidated, or using simple matching algorithms. Unfortunately, conventional methods are not particularly effective and are not remotely scalable. As a consequence, application designers are unable to maintain disambiguated graph databases and thus more limited in the types of features they can offer to users based on those graph databases.

Accordingly, what is needed is a method to disambiguate entities in graph databases accurately and scalably.

BRIEF SUMMARY

Certain embodiments provide a method for disambiguating graph data, including: receiving entity data from a data source in a first format; converting the entity data in the first format to a second format, wherein the second format is a standardized input format for a disambiguation pipeline; determining a blocked data set from the entity data in the second format based on a blocking parameter, wherein: the blocked data set comprises data regarding a first plurality of entities, and the first plurality of entities is a subset of a second plurality of entities represented in the entity data from the data source; matching at least two entities in the first plurality of entities in the blocked data set; merging the at least two entities into a single entity; generating a unique ID for the single entity; and importing the single entity into a graph database.

Other embodiments provide systems for performing methods for disambiguating graph data, such as the aforementioned method. Yet other embodiments provide a non-transitory computer-readable medium comprising instructions for performing methods for disambiguating graph data, such as the aforementioned method.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
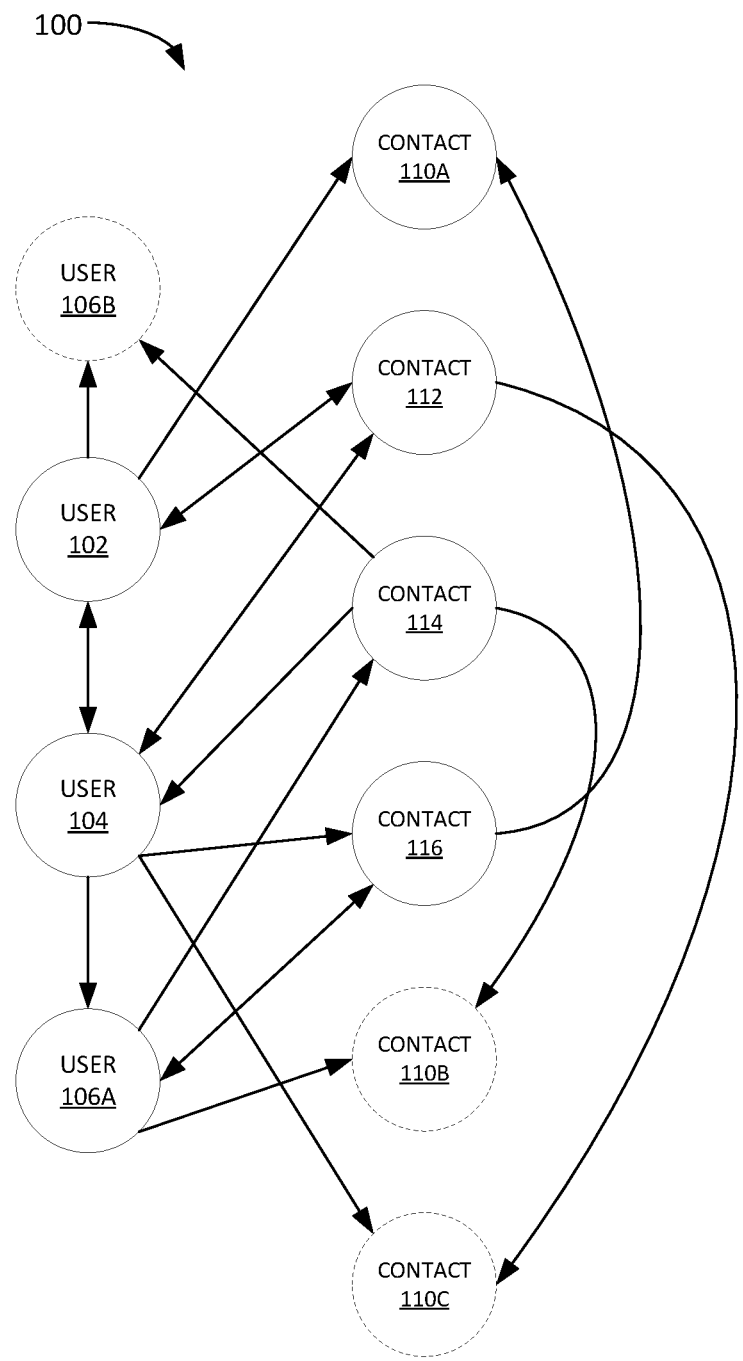
FIG. 1 depicts an example graph database structure.

Aspects of the present disclosure provide apparatuses, methods, processing systems, and computer readable mediums for disambiguating graph databases.

A graph database organizes data using graph structures, such as nodes, edges, and properties of the nodes and edges.

Nodes may represent entities such as people, businesses, accounts, events or any other discrete instance. In some cases, nodes are referred to alternatively as vertices or entities of the graph structure.

Edges, also termed graphs or relationships, connect nodes to other nodes (often depicted as lines between nodes), and represent the relationship between them. The relationships allow data in the graph database structure to be linked together directly, and in many cases retrieved with one operation. Edges may either be directed or undirected. In an undirected graph, an edge from a node to another node may have a single meaning, whereas in a directed graph, the edges connecting two different nodes have different meanings depending on their direction. Thus, edges are a key concept in graph databases, representing an abstraction that is not directly implemented in a relational model or a document-store model.

Properties may be information about or otherwise relevant to nodes and/or edges. In some cases, properties may be referred to as attributes, features, or metadata associated with the nodes and/or edges. For example, a node representing a contact record may include many properties, such as "name", "address", "notes", etc. Similarly, an edge between a user and a contact may also include properties, such as a specific ID relating the two entities, a directionality of the relationship, a date upon which the relationship was established, and others.

Querying relationships within a graph database is generally fast because they are inherently stored within the structure of the graph database. Further, relationships between entities (e.g., nodes) in graph databases can be intuitively visualized, making it useful for heavily interconnected data. More generally, meaningful patterns may emerge when examining the connections and interconnections of nodes, properties, and edges.

Graph databases may be used by organizations to offer services to application users. For example, graph databases may help an organization create connections between users (e.g., between small businesses using financial management applications), which may lead to collaboration, new business opportunities, etc. Such services provide significant value to application users and thus significant business opportunity for application providers.

Networks maintained by users (e.g., users' contacts) are particularly valuable because of their ability to scale exponentially—the so-called "network effect". However, this same aspect means that processing the data structures, such as graph databases, that embody the various users' networks is computationally complex and time consuming. This is especially true when, as described above, the graph databases include many redundant entities due to the way in which the application captures data from users.

Described herein is a method for disambiguating graph databases, which is particularly useful for large or even massive graph databases, such as those created when capturing the various relationships stored by a large user base of an application. The method generally includes collecting entity data from disparate sources, disambiguating the data through a novel multi-stage data disambiguation pipeline, and then exporting the disambiguated entity data to a knowledge graph.

The methods described herein improve upon conventional methods for building and maintaining graph databases, which do not include a multi-staged disambiguation "pipeline" approach to reducing entity ambiguity. For example, conventional methods may focus on manual or automated pairwise comparison of entities in a graph database structure. Such conventional methods, however, are not scalable to large graph databases. The performance problems with conventional methods of disambiguating large graph databases results in the process being performed less frequently. Consequently, the large graph databases grow increasingly congested with duplicative data, which drives the unvirtuous cycle. Moreover, conventional methods fail to capture many related entities owing to the simplicity of the comparison logic; for example, requiring exact matches of entity attribute data rather than being able to match entities based on more sophisticated machine learning methods integrated into the multi-stage pipeline, as described herein.

As described in more detail below, the disambiguation of graph databases provides not only better potential for service offerings though greater understanding of the network structure captured by the graph database's structure, but also significantly improves processing speeds for applications accessing the graph databases (e.g., through faster queries) and devices hosting the graph database due to the reduction of unnecessary resource use (e.g., processing and memory) when redundant entities are eliminated from the graph database. The resulting optimized graph database may be referred to as a "knowledge graph."

Example Graph Database Structure

FIG. 1 depicts an example graph database structure 100. In this example, there are three individual users 102, 104, and 106 as well as four individual contacts of the set of users, including 110, 112, 114, and 116. The relationships between the various users and the various contacts are indicated by the edges running between them, which in this example are represented by either unidirectional or bidirectional arrows depending on the nature of the relationship.

However, as depicted in FIG. 1, certain entities, such as user 106 and contact 110, are represented by multiple nodes despite being a single entity. For example, user 104 and contact 116 have relationships with user 106A (e.g., "Robert Smith"). Meanwhile, contact 114 and user 102 have relationships with user 106B (e.g., "Bob Smith"). But Robert Smith is Bob Smith. Unfortunately, from the perspective of the organization maintaining a graph, it is not possible to make additional connections based on the relationships between user 106A ("Robert Smith") and user 106B ("Bob Smith") because it is ambiguous as to whether they are the same entity. Indeed, in graph database structure 100, they are completely separate entities.

As another example, user 102 and contact 116 have relationships with contact 110A (e.g., "Bob's Submarine Shop"), user 106A and contact 114 have relationships with contact 110B (e.g., "Bob's Subs"), and user 104 and contact 112 have relationships with contact 110C (e.g., "Bob's Sub Sandwiches"). But here again, contacts 110A, 110B, and 110C are all really the same entity-Bob's Submarine Shop. However, here again, to the organization maintaining graph database structure 100, the real connections between all of the entities in the graph database structure are obscured by the different ways in which each name is recorded differently (e.g., in an attribute of nodes 110A, 110B, and 110C).

Note that while a simple example of mismatched names is discussed in the context of FIG. 1, ambiguities between entities in a graph database structure (such as 100) can arise from a myriad of data disconnects. For example, a changed property of an entity (e.g., a changed address after a recent move) may not be picked up by all nodes with a relationship to that entity right away. Thus, if a node creates a new relationship with a particular entity, but using a new address, that may create an entirely new node in a graph database rather than an association with the existing node. As another example, a missing attribute value (e.g., a missing component of an address, such as a suite number) may cause the same problem. As yet another example, a simple error in a data entry for a node attribute (e.g., a misspelling) may cause the same problem. As yet another example, abbreviations, truncations, or substitutions (e.g., "R." for Robert, "Rob" for Robert, or "Bob" for Robert) may cause the same problem. As yet another example, data formatting (e.g., a zip code formatted as "#####" versus "#####-####", or a state referred to as "California" versus "CA") may cause the same problem. As yet another example, inherent entity ambiguity (e.g., two contacts with the same first and last name, or two businesses with the same name, but otherwise unrelated) may cause the same problem. Notably, these are just some of the examples and many others exist.

Further yet, large graph structures often become segmented into disconnected subgraphs even though relationships exist between members of disconnected subgraphs. When this occurs, the organization maintaining the graph is not able to easily infer connections across its whole user base as represented in the graph structure. So, for example, the graph structure depicted in FIG. 1 may in fact be only on subgraph of many disconnected subgraphs in a greater graph structure. Coupled with redundant graph entities, the overall utility of such graphs is compromised.

Thus, ambiguities in graph data structure 100 obfuscate the real relationships and networks that exist between the individual entities. Further yet, the additional nodes and edges, which would otherwise be unnecessary with a correct graph data structure, may reduce the performance of a processing system hosting graph database structure 100 (e.g., by increasing processing time and memory usage) because additional nodes and edges need traversal and processing when querying graph database structure 100. Further, the results of the queries may be informationally incomplete due to the obscured relationships between the actual entities in the network. While the severity of the aforementioned problems may seem insignificant in view of the very simple graph database structure 100 depicted in FIG. 1, the graph database structures used by organizations may have billions of nodes and edges; in other words, they are truly massive. At that scale, these issues create significant performance and complexity challenges for the organization and the processing systems hosting the graph databases.

Example System for Creating Disambiguated Knowledge Graphs

Figure 2:
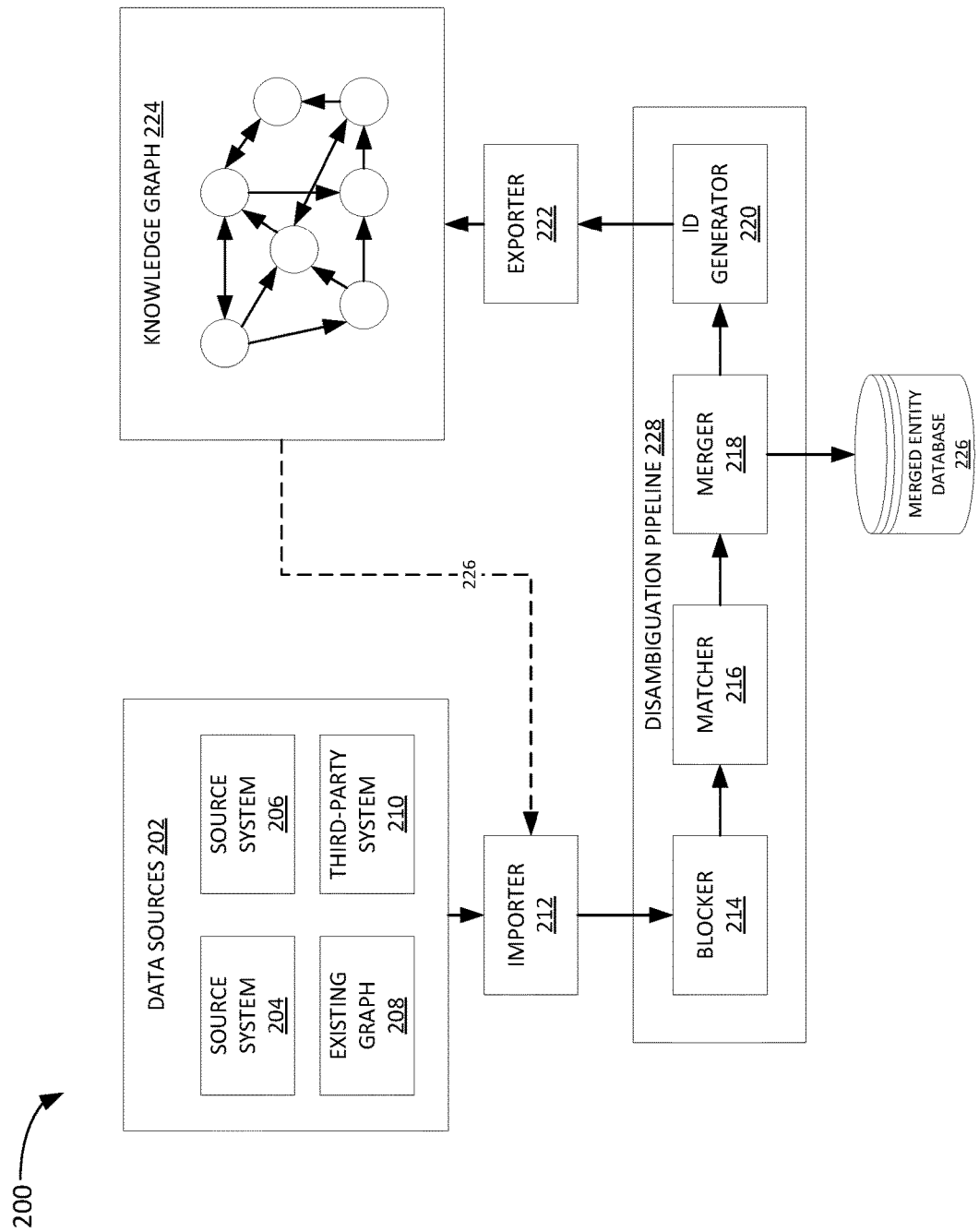
FIG. 2 depicts an example system for creating disambiguated graph databases.

FIG. 2 depicts an example system 200 for creating disambiguated graph databases, which may be referred to as "knowledge graphs". As discussed with respect to FIG. 1, many different scenarios may lead to ambiguities in graph databases, which manifest in additional nodes and edges that are not necessary to depict the actual network of relationships of the entities in the graph database.

The system depicted in FIG. 2 includes a disambiguation pipeline 228 that prevents the creation of these additional (and unnecessary) nodes and edges and thereby improves the performance of the associated graph databases—both in terms of the performance of the applications relying on the graph databases for data (e.g., through faster query times) and the processing systems hosting the graph databases (e.g., through lower processor and memory resource utilization).

Key to the ability to build rich graph databases is the ability to ingest data from many data sources 202. In this example, data sources 202 include source system 204 and source system 206, which may be, for example, applications, existing data stores, databases, application-specific data structures, or other data repositories maintained by an organization. Notably, while source systems 204 and 206 may be created and maintained by the same organization, they may nevertheless be very different in form and function. For example, some of the ambiguities discussed above may be inherent to different source systems, such as where source system 204 stores a "state" attribute as a two letter abbreviation (e.g., "CA") while source system 206 stores the "state" attribute as a full length name (e.g., "California").

Data sources 202 also include one or more existing graph databases 208. For example, a graph database such as depicted in FIG. 1, may serve as a starting point for building a disambiguated knowledge graph (e.g., 224).

Data sources 202 also includes one or more third-party systems or databases 210 or other sorts of data repositories. For example, an organization may have access to third-party databases through application programming interfaces (APIs), shared data channels, shared data repositories, purchased or licensed data sets, or the like.

Notably, the composition of data sources depicted in FIG. 2 is just one example, and any number or type of data source may be imported to disambiguation pipeline 228 by way of importer 212. Indeed, data sources 202 may be a dynamic mixture of incoming new data sources and outgoing old data sources as data is integrated into knowledge graph 224. Thus, more generally speaking, data sources 202 may provide a heterogeneous set of data that is not consistently structured, not clean, and not complete.

Importer 212 ingests data from data sources 202 in one or more native formats and converts the data to a standardized format for processing by disambiguation pipeline 228.

For example, the ingested data may be "cleaned", which may refer to identifying incomplete, incorrect, inaccurate or irrelevant parts of the data and then replacing, modifying, or deleting the "dirty" data. For example, data may be cleaned by removing stop words from a stop word dictionary, removing unsupported or unwanted symbols, fixing misspellings, performing stemming, etc.

Further the ingested data may be normalized so that various attributes are consistently maintained between entities. For example, word replacement may be used to normalize different forms of the same underlying word (e.g., "Incorporated" for "Inc." or "it is" for "it's", etc.).

In some cases, importer 212 may change the character of the underlying data, such as the format, file type, encryption type, compression type, etc.

As another example, importer 212 may disassemble existing combined data structures into component data structures so that the data fed into disambiguation pipeline 228 in discrete units. For example, a source database may be fed to disambiguation pipeline 228 one row at a time.

As yet another example, ingested data may be standardized based on its type. For example, address data may be passed through an address standardizer/geocoding process that ensures the resulting record adheres to a standardized address format (including geographic coordinates).

Because of the potentially dynamic nature of data sources 202 (as described above), importer 212 serves an important system function by avoiding the need to reconfigure disambiguation pipeline 228 for each new data source. Rather, disambiguation pipeline 228 may act as a modular feature of system 200.

After preparing the set of standardized entity data, importer 212 provides the entity data to disambiguation pipeline 228.

In this example, the first stage of disambiguation pipeline 228 is blocking by blocker component 214. Generally, "blocking" limits comparison of entity data by one or more identifiable common attributes. For example, blocking may limit the comparison of entities (e.g., businesses) by common cities (e.g., Mountain View). In this way, the number of pairwise comparisons between entities imported by importer 212 from data sources 202 may be significantly limited. This limitation has non-trivial performance implications.

For example, consider an example where 1,000 business entities from each of 1,000 different cities (i.e., n=1,000,000 total business entities) need pairwise comparison. Without blocking, this requires $n^2$=1,000,000,000,000 (1 trillion) pairwise comparisons. Even with significant processing resources, this number of comparisons takes a significant amount of time to complete. For example, if each comparison takes 1 microsecond, then the 1 trillion comparisons will require 11.6 days to complete. By contrast, if blocking is implemented based on an attribute such as a common city i.e., where only businesses in the same cite are compared, then only 1,000,000,000 (1 billion) comparisons are needed. At the same sample speed as above (1 microsecond/comparison), the processing completes in 16 minutes. Thus, with blocking, the order of complexity gets divided by the number of blocks i.e., $$\frac{n^2}{k},$$

where k is the number of blocks. So, in this case $n^2$=1,000,000,000,000 (1 trillion) pairwise comparisons divided by k=1,000 blocks=1,000,000,000 (1 billion) resulting comparisons. Thus, blocking can significantly improve the performance of the underlying application as well as the efficiency of the processing system as a whole.

Notably, blocking can be implemented based on any common data attribute of the imported data (e.g., same site, same state, same name, same type, same category, same field, etc.), and in some cases may be applied to only subsets of the imported data where the common attribute exists.

In some implementations, the imported data may be partitioned or bucketed initially before blocking. For example, imported data may be bucketed based on hashes of the data and a MinHash method may be used for non-deterministic attributes, where MinHash (or the min-wise independent permutations locality sensitive hashing scheme) is a technique for quickly estimating the similarity of two sets of data. The buckets may be used as the basis for blocking as described above.

Blocked data sets (e.g., a set of entities all sharing a common characteristic, property, attribute, or the like) may then be matched by matcher component 216. Matching involves determining which entities match i.e., are the same entity despite existing as separate entities in the imported data. Returning to the example discussed above, matcher component 216 may determine that "Bob's Submarine Shop", "Bob's Subs" and "Bob's Sub Sandwiches" all refer to the same entity.

Matching can be performed by a variety of methods, including probabilistic methods, such as machine learning methods, as well as deterministic methods, such pairwise comparison, for exact matches, edit distances (e.g., Levenshtein distance), ground truth knowledge, and the like. These different methods may be combined in some examples to improve the quality of the matching. In one implementation, similarity scores from multiple matching methods may input to a machine learning model to learn the best way to combine the scores based on a fully labeled "golden" data set where all the matches are known.

In some implementations, a first cut at matching entities in a blocked data set may include grouping like entities based on one or more matching attributes. For example, entities in a blocked data set may be grouped by location (e.g., neighborhood or zip code), by type (e.g., a type of business), by tax status (e.g., profit vs non-profit), and many other attributes. These initial groupings may improve overall matching by avoiding erroneous matches of very similar, but otherwise distinct entities. For example, different locations of the same business chain, which should be treated as distinct entities despite all their similarities, may be grouped apart based on neighborhood data.

Probabilistic matching methods, such as clustering algorithms (e.g., hierarchical clustering algorithms, centroid-based clustering algorithms, density-based clustering algorithms, and others) may be used to match entities as well. In some cases, a threshold based on the probabilistic method may be established to determine when a match is determined by that method.

In some examples, ensembles of probabilistic methods may be used, for example, to first cluster entities and then to refine the clusters by a second technique, such as measuring edit distances or applying another machine learning algorithm. This refinement may improve the likelihood that matched entities are indeed the same entity.

Matched entities may next be merged to form a unified entity by merger component 218. For example, "Bob's Submarine Shop", "Bob's Subs" and "Bob's Sub Sandwiches" may be merged into a single entity referred to as "Bob's Submarine Shop". Note that it is possible that a new merged entity may include one or more of the same attributes as the underlying entities, e.g., the same name as an underlying entity.

Merging may include consolidating data (e.g., properties or attributes) from matched entities to form a new entity with a superset of the properties or attributes of the underlying merged entities. In some cases, such as where two entities to be merged have a data field (e.g., address) with non-matching data entries, a decision algorithm may be used to choose the data entry for the merged entity.

Merging may also include updating relationship information related to any merged entity such that the merged entities have valid relationships. An example of this is described below with respect to FIG. 4.

In some implementations, merger component 218 may create an entry in a database or other data store indicating a relationship between the merged entity and the underlying entities matched in by matcher 216. For example, the relationship data may be stored in a merged entity database such as 226.

Once merging by merger component 218 is complete, the merged entities may then be provided to ID generator 220 to generate a unique ID for the merged entity. Creating a unique ID for a merged entity ensures continuity of entity IDs across various processing runs of data through disambiguation pipeline 228. Further, the unique IDs provide a definitive way to maintain the validity of relationships between entities with the unique IDs.

Exporter 222 may receive disambiguated entities from disambiguation pipeline 228 and prepare the entities for entry into knowledge graph 224. Preparation may include formatting entity and relationship data for compatibility with knowledge graph 224.

In some implementations, exporter 222 may export the underlying entities in addition to the new merged entity created in step 218. For example, returning to the earlier example, the new merged entity for "Bob's Submarine Shop" may be exported in addition to the underlying entities of "Bob's Submarine Shop", "Bob's Subs", and "Bob's Sub Sandwiches". In such cases, exporter 222 may create edges between the merged entity and the underlying entities to knowledge graph 224 in order to maintain the historical relationships between the merged entities and other entities in the knowledge graph. However, relationships between unique entities in knowledge graph 222 may all be between the merged entities with unique IDs (e.g., between "Bob's Submarine Shop" and "Mo's Meat Supply".

Finally, the disambiguated entity and relationship data is added to knowledge graph 224 by exporter 222.

In some implementations, data from knowledge graph 224 may be imported back into disambiguation pipeline 228 via importer 212 as depicted by arrow 226 in FIG. 2. In this way, continual improvement may be made to knowledge graph 224 (e.g., by preventing the introduction of redundant entities through multiple, independent data processing runs through disambiguation pipeline 228.

Notably, while depicted and described with respect to certain exemplary components in FIG. 2, system 200, including disambiguation pipeline 228, may have different components in other implementations. For example, disambiguation pipeline 228 may have further components for additional processing.

In some implementations, disambiguation pipeline 228 may be configured as a framework wherein components, such as blocker component 214, matcher component 216, merger component 218, and ID generator component 220 are classes or plugins to the framework. Thus, the pipeline framework may have core framework code that allows instantiation of class objects or interaction with plugins in a defined manner. This allows the disambiguation pipeline to be quickly deployed and flexibly configured. For example, a disambiguation pipeline configuration file may include configuration parameters for setting up different configurations of disambiguation pipelines.

Further, a disambiguation pipeline framework may include utilities, such as logging and metric components, which measure performance with respect to any instantiated disambiguation pipelines. In some cases, importer 212 and exporter 222 may similarly be standard class objects for a disambiguation pipeline framework or custom plugins or classes.

Such a framework may be easily connected to existing data sources in order to produce disambiguated graph data structures, such as knowledge graph 224.

Example Method for Disambiguating Graph Data

Figure 3:
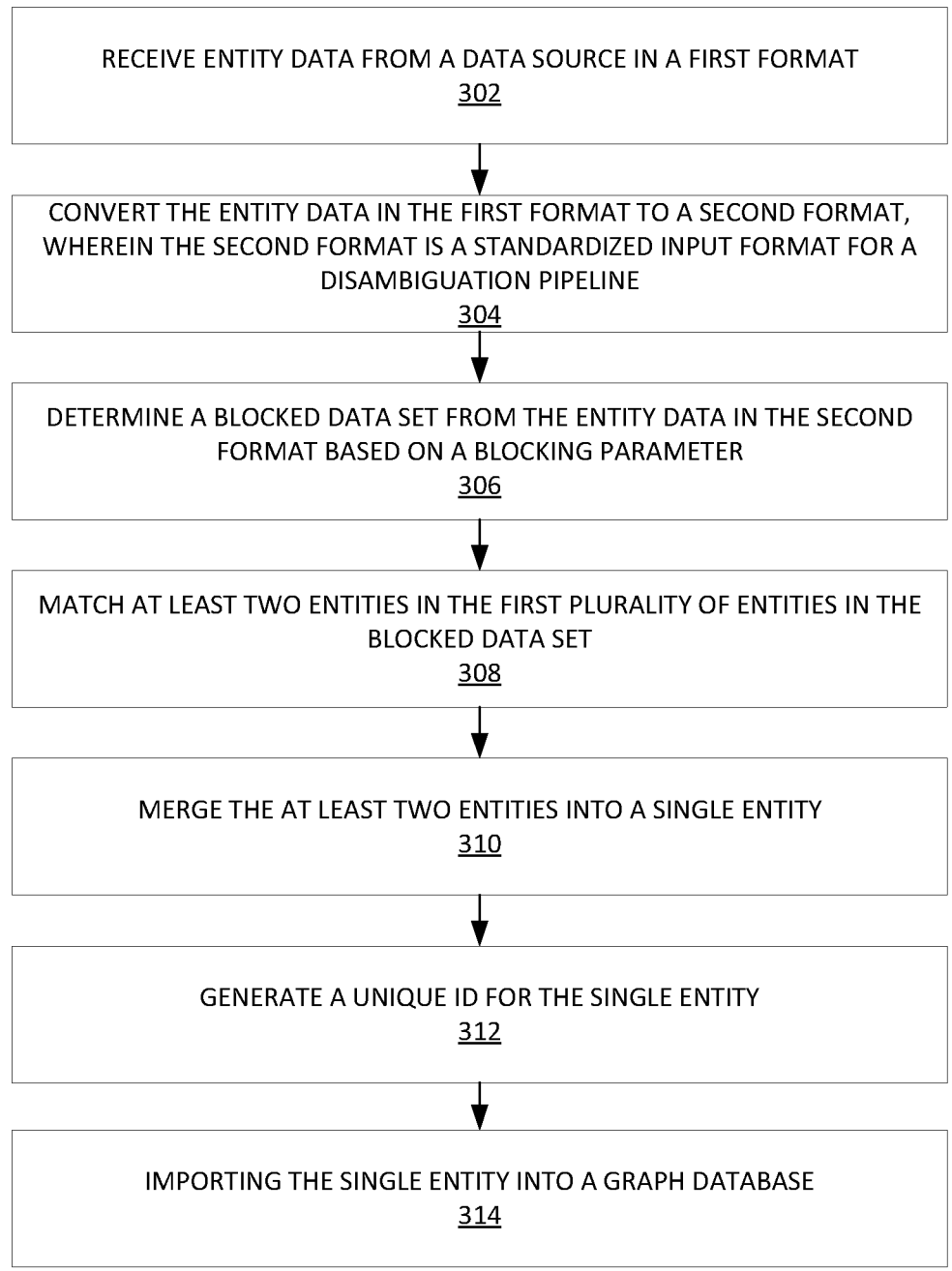
FIG. 3 depicts an example method for disambiguating graph data.

FIG. 3 depicts an example method 300 for disambiguating graph data, such as may be stored in a graph database structure.

Method 300 begins at step 302 with receiving entity data from a data source in a first format. For example, the entity data could be received from a variety of sources such as those discussed in FIG. 2. In some cases, the data source is an existing graph database.

Method 300 then proceeds to step 304 with converting the entity data in the first format to a second format, wherein the second format is a standardized input format for a disambiguation pipeline. As discussed above, the standardized input format may be created by cleaning and/or normalizing input data, as well as changing underlying formats of the data, and decomposing grouped data in order that a disambiguation pipeline can ingest data from any source.

Method 300 then proceeds to step 306 with determining a blocked data set from the entity data in the second format based on a blocking parameter. In some examples, the blocked data set comprises data regarding a first plurality of entities (e.g., businesses from a particular city), and the first plurality of entities is a subset of a second plurality of entities represented in the entity data from the data source (e.g., businesses from a plurality of cities). Further, the blocking parameter may be a value related to any attribute of the entities in the entity data (e.g., city, industry type, tax status, etc.). Notably, the attribute need not be a part of each entity.

Method 300 then proceeds to step 308 with matching at least two entities in the first plurality of entities in the blocked data set. Though using two entities as an example here for simplicity, many entities may be matched.

In some implementations matching the at least two entities in the first plurality of entities in the blocked data set includes matching the at least two entities based on at least one identical attribute associated with each entity. Note that in such cases the matched attribute would be different than the blocking parameter as all of the entities in the blocked data set would already share that attribute.

In some implementations, matching the at least two entities in the first plurality of entities in the blocked data set includes matching the at least two entities based on a machine learning algorithm. For example, as described above, the algorithm may be a clustering algorithm.

In some implementations, matching the at least two entities in the first plurality of entities in the blocked data set includes forming at least one group of entities from the first plurality of entities based on a matching attribute for all of the entities in the at least one group. In other words, the blocked data may be effectively blocked again by a different attribute in order to form further groups of data within the blocked data set. However, the groups within the blocked data set may likewise be formed by probabilistic methods in addition to deterministic methods such as attribute matching.

Method 300 then proceeds to step 310 with merging the at least two entities into a single entity. As described above, merging may include consolidating data between the two entities and, in some cases, deciding between which data to keep where there is differing data for the same attribute across entities.

Method 300 then proceeds to step 312 with generating a unique ID for the single entity. The unique ID may be generated by any appropriate function for generating one time unique IDs.

Method 300 then concludes at step 314 with importing the single entity into a graph database. For example, the graph database may be a knowledge graph as discussed above with respect to FIG. 2.

In some implementations of method 300, the disambiguation pipeline includes: a blocking component configured to determine the blocked data set from the entity data in the second format based on the blocking parameter; a matching component configured to match the at least two entities in the first plurality of entities in the blocked data set; a merging component configured to merge the at least two entities into the single entity; and a ID generator component configured to generate a unique ID for the single entity. Further, in some implementations of method 300, the blocking component, the matching component, the merging component, and the ID generator component are all instances of a standard object class of a disambiguation pipeline framework.

Example Disambiguated Graph

Figure 4:
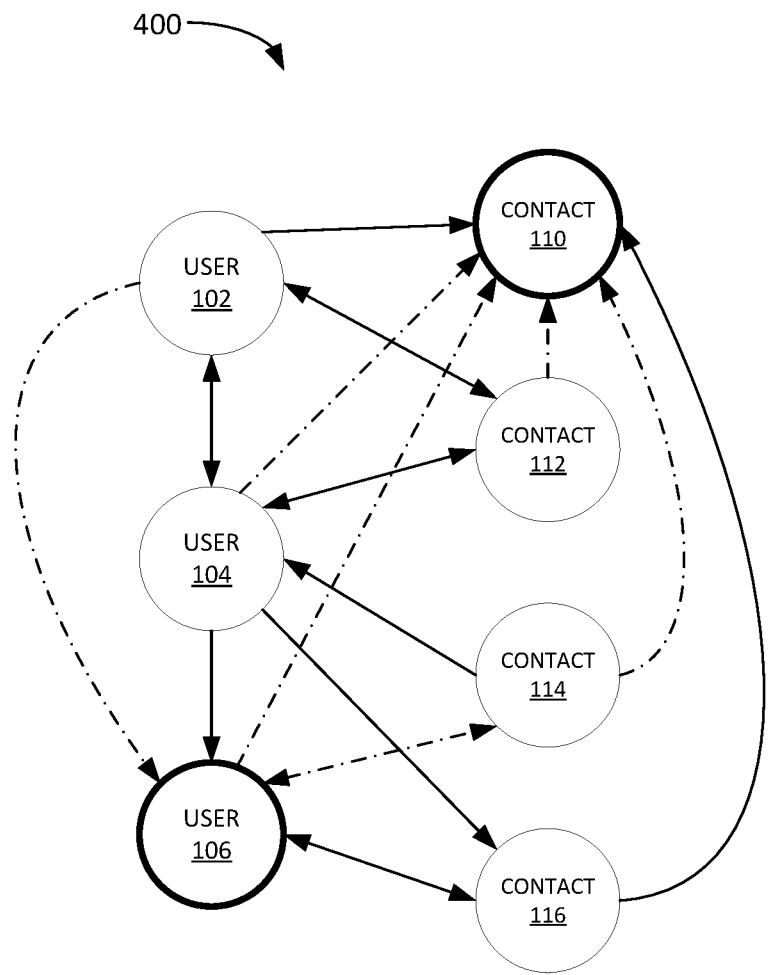
FIG. 4 depicts an example of a disambiguated graph data structure.

FIG. 4 depicts an example of a disambiguated graph data structure 400 based on the entities and relationships in graph database structure 100 of FIG. 1. Disambiguated graph data structure 400 may be referred to as knowledge graph 400, such as described with respect to FIG. 2. Knowledge graph 400 could be the result of the original importation of data from an existing graph, such as 208 in FIG. 2, through a disambiguation pipeline, such as 228 in FIG. 2.

As depicted in FIG. 4, users 106A and 106B have been matched and merged (e.g., disambiguated) into single user 106. The dot-dash edges leading to and from user 106 indicate revised relationships based on the disambiguation process.

Similarly, contact 110A, 110B, and 110C have been matched and merged into contact 110. And here again, the dot-dash edges leading to and from contact 110 indicate revised relationships based on the disambiguation process.

The disambiguation of graph database structure 100 in FIG. 1 into knowledge graph 400 in FIG. 4 results in quantitative improvements of the graph structure. For example, here the disambiguation reduces the total nodes from ten in graph database structure 100 to seven in knowledge graph 400, which is a 30% improvement. Further, the number of total edges is reduced from sixteen to fifteen, which is a 6% improvement. These improvements translate directly into improved performance of any application relying on knowledge graph 400 (e.g., by querying it for information) as well as the underlying processing system since fewer nodes and edges need to be traversed to access the knowledge graph's full network. This saves processing cycles as well as memory use in the processing system, which improves the performance of the processing system (e.g., freeing it to perform other tasks simultaneously).

Further yet, FIG. 4 depicts qualitative improvements to knowledge graph 400. For example, in knowledge graph 400, contact 110's network connectivity is significantly more comprehensive. This sort of insight may lead an organization maintaining this graph to offer additional services to users within the network connected with contact 110.

As above, knowledge graph 400 is a simple example for purposes of demonstrating concepts discussed herein. Production graph database structures may be enormous in scope (as above, having billions of nodes and edges), which means that the improvements discussed herein will provide significant improvements quantitatively and qualitatively.

Example Processing System

Figure 5:
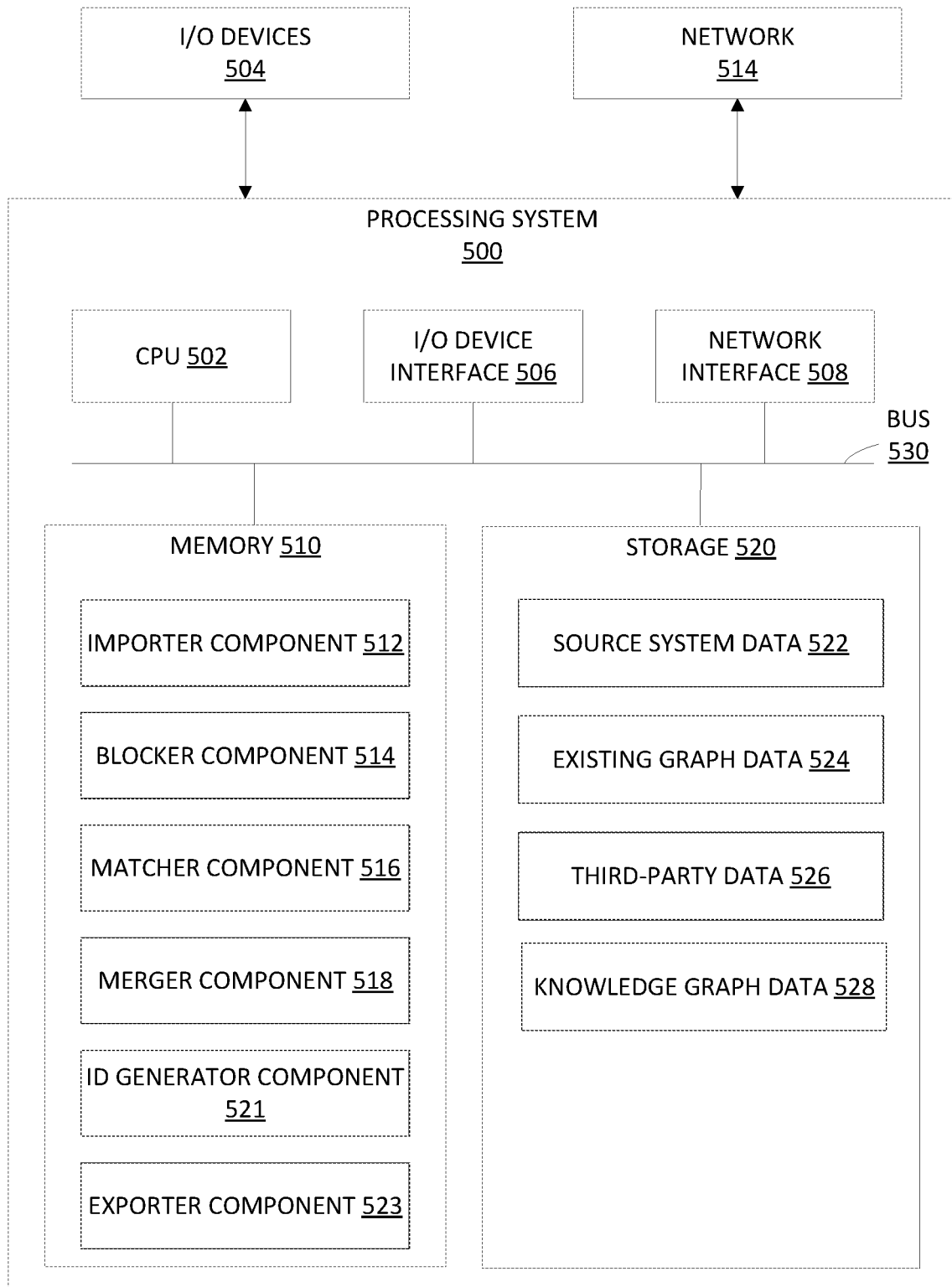
FIG. 5 depicts an example processing system for disambiguating graph data.

FIG. 5 depicts an example processing system 500 for disambiguating graph data. For example, processing system 500 may be configured to perform method 300 described with respect to FIG. 3 as well as other operations described herein.

Processing system 500 includes a CPU 502 connected to a data bus 530. CPU 502 is configured to process computer-executable instructions, e.g., stored in memory 510 or storage 520, and to cause processing system 500 to perform methods as described herein, for example with respect to FIG. 3. CPU 502 is included to be representative of a single CPU, multiple CPUs, a single CPU having multiple processing cores, and other forms of processing architecture capable of executing computer-executable instructions.

Processing system 500 further includes input/output device(s) 504 and input/output interface(s) 506, which allow processing system 500 to interface with input/output devices, such as, for example, keyboards, displays, mouse devices, pen input, and other devices that allow for interaction with processing system 500.

Processing system 500 further includes network interface 508, which provides processing system 500 with access to external networks, such as network 514.

Processing system 500 further includes memory 510, which in this example includes a plurality of components.

For example, memory 510 includes importer component 512, which is configured to perform importing functions as described above (e.g., with respect to importer component 212 in FIG. 2).

Memory 510 further includes blocker component 514, which is configured to perform blocking functions as described above (e.g., with respect to blocker component 214 in FIG. 2).

Memory 510 further includes matcher component 516, which is configured to perform matching functions as described above (e.g., with respect to matcher component 216 in FIG. 2).

Memory 510 further includes merger component 518, which is configured to perform merging functions as described above (e.g., with respect to merger component 218 in FIG. 2).

Memory 510 further includes ID generator component 521, which is configured to perform ID generating functions as described above (e.g., with respect to ID generator component 220 in FIG. 2).

Memory 510 further includes exporter component 523, which is configured to perform exporting functions as described above (e.g., with respect to exporter component 222 in FIG. 2).

Note that while shown as a single memory 510 in FIG. 5 for simplicity, the various aspects stored in memory 510 may be stored in different physical memories, but all accessible CPU 502 via internal data connections, such as bus 530.

Processing system 500 further includes storage 520, which in this example includes source system data 522, which may be data provided by source systems such as 204 and 206 in FIG. 2.

Storage 520 further includes existing graph data 524, which may be data provided by an existing graph, such as existing graph 208 in FIG. 2.

Storage 520 further includes third-party data 526, which may include data from third-party systems or databases such as third-party system 210 in FIG. 2.

Storage 520 further includes knowledge graph data 528, which may include data from a knowledge graph such as 224 in FIG. 2.

As with memory 510, a single storage 520 is depicted in FIG. 5 for simplicity, but the various aspects stored in storage 520 may be stored in different physical storages, but all accessible to CPU 502 via internal data connections, such as bus 530, or external connection, such as network interface 508. Further, the various aspects stored in storage 520 may be loaded into memory 510.

Notably, the various aspects of processing system 500, including the components in memory 510 and the data in storage 520 are just one example, and many others are possible consistent with the methods and systems disclosed herein.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for disambiguating graph data, comprising:
   receiving entity data from a data source, wherein the entity data comprises a set of nodes;
   determining, based on a blocking parameter, a blocked data set comprising a subset of nodes from the set of nodes, wherein each node in the subset of nodes matches the blocking parameter;
   matching at least two nodes in the blocked data set based on the at least two nodes representing a matched entity;
   creating a new node associated with the matched entity by merging the matched at least two nodes into the new node;
   generating a unique ID for the new node;
   updating a graph database with the new node, including:
      creating one more edges between the new node and one or more other nodes having edges to the matched at least two nodes; and
      removing the matched at least two nodes and all edges associated with the matched at least two nodes.

2. The method of claim 1, wherein matching the at least two nodes in the blocked data set based on the at least two nodes representing a matched entity comprises matching the at least two nodes based on at least one identical attribute associated with each node of the at least two nodes that is different from the blocking parameter.

3. The method of claim 1, wherein matching the at least two nodes in the blocked data set comprises matching the at least two nodes based on a machine learning algorithm.

4. The method of claim 3, wherein the machine learning algorithm is a clustering algorithm.

5. The method of claim 1, wherein matching the at least two nodes in the blocked data set based on the at least two nodes representing a matched entity comprises forming at least one group of nodes in the blocked data set based on a matching attribute for all nodes in the at least one group of nodes.

6. The method of claim 1, further comprising converting the entity data from a first format into a second format, wherein
   the second format is a standardized input format for a disambiguation pipeline; and
   the disambiguation pipeline comprises:
      a blocking component configured to determine the blocked data set from the entity data in the second format based on the blocking parameter;
      a matching component configured to match the at least two nodes in the blocked data set;
      a merging component configured to merge the at least two nodes into the new node; and
      a ID generator component configured to generate a unique ID for the new node,
      wherein the blocking component, the matching component, the merging component, and the ID generator component are all instances of a standard object class of a disambiguation pipeline framework.

7. The method of claim 1, wherein the data source is an existing graph database.

8. A system for disambiguating graph data, comprising:
   a memory storing computer-executable instructions;
   a processor configured to execute the computer-executable instructions and to cause the system to:
      receive entity data from a data source in a first format, wherein the entity data comprises a set of nodes;
      determine, based on a blocking parameter, a blocked data set comprising a subset of nodes from the set of nodes, wherein each node in the subset of nodes matches the blocking parameter;
      match at least two nodes in the blocked data set based on the at least two nodes representing a matched entity;
      create a new node associated with the matched entity by merging the matched at least two nodes into the new node;
      generate a unique ID for the new node; and
      update a graph database with the new node, including:
         creating one more edges between the new node and one or more other nodes having edges to the matched at least two nodes; and
         removing the matched at least two nodes and all edges associated with the matched at least two nodes.

9. The system of claim 8, wherein the processor being configured to cause the system to match the at least two nodes in the blocked data set based on the at least two nodes representing a matched entity comprises the processor being configured to cause the system to match the at least two nodes based on at least one identical attribute associated with each node of the at least two nodes that is different from the blocking parameter.

10. The system of claim 8, wherein the processor being configured to cause the system to match the at least two nodes in the blocked data set comprises the processor being configured to cause the system to match the at least two nodes based on a machine learning algorithm.

11. The system of claim 10, wherein the machine learning algorithm is a clustering algorithm.

12. The system of claim 8, wherein the processor being configured to cause the system to match the at least two nodes in the blocked data set based on the at least two nodes representing a matched entity comprises the processor being configured to cause the system to form at least one group of nodes in the blocked data set based on a matching attribute for all nodes in the at least one group of nodes.

13. The system of claim 8, wherein the processor is further configured to cause the system to convert the entity data from a first format into a second format, wherein:
the second format is a standardized input format for a disambiguation pipeline; and
the disambiguation pipeline comprises:
a blocking component configured to determine the blocked data set from the entity data in the second format based on the blocking parameter;
a matching component configured to match the at least two nodes in the blocked data set;
a merging component configured to merge the at least two nodes into the new node; and
a ID generator component configured to generate a unique ID for the new node,
wherein the blocking component, the matching component, the merging component, and the ID generator component are all instances of a standard object class of a disambiguation pipeline framework.

14. The system of claim 8, wherein the data source is an existing graph database.

15. A non-transitory computer-readable medium comprising computer-executable instructions that, when executed by a processor of a processing system, cause the processing system to perform a method for disambiguating graph data, the method comprising:
receiving entity data from a data source, wherein the entity data comprises a set of nodes;
determining, based on a blocking parameter, a blocked data set comprising a subset of nodes from the set of nodes, wherein each node in the subset of nodes matches the blocking parameter;
matching at least two nodes in the blocked data set based on the at least two nodes representing a matched entity;
creating a new node associated with the matched entity by merging the matched at least two nodes into the new node representing the same matched entity;
generating a unique ID for the new node;
updating a graph database with the new node, including:
creating one more edges between the new node and one or more other nodes having edges to the matched at least two nodes; and
removing the matched at least two nodes and all edges associated with the matched at least two nodes.

16. The non-transitory computer-readable medium of claim 15, wherein matching the at least two nodes in the blocked data set based on the at least two nodes representing a matched entity comprises matching the at least two nodes based on at least one identical attribute associated with each node of the at least two nodes that is different from the blocking parameter.

17. The non-transitory computer-readable medium of claim 15, wherein matching the at least two nodes in the blocked data set comprises matching the at least two nodes based on a machine learning algorithm.

18. The non-transitory computer-readable medium of claim 17, wherein the machine learning algorithm is a clustering algorithm.

19. The non-transitory computer-readable medium of claim 15, wherein matching the at least two nodes in the blocked data set based on the at least two nodes representing a matched entity comprises forming at least one group of nodes in the blocked data set based on a matching attribute for all nodes in the at least one group of nodes.

20. The non-transitory computer-readable medium of claim 15, wherein the method further comprises converting the entity data from a first format into a second format and wherein:
the second format is a standardized input format for a disambiguation pipeline; and
the disambiguation pipeline comprises:
a blocking component configured to determine the blocked data set from the entity data in the second format based on the blocking parameter;
a matching component configured to match the at least two nodes in the blocked data set;
a merging component configured to merge the at least two nodes into the new node; and
a ID generator component configured to generate a unique ID for the new node,
wherein the blocking component, the matching component, the merging component, and the ID generator component are all instances of a standard object class of a disambiguation pipeline framework.

\* \* \* \* \*